UNITED STATES PATENT OFFICE.

RICHARD HARTLEB, OF AACHEN, GERMANY, ASSIGNOR TO CHEMISCHE FABRIK RHENANIA, OF SAME PLACE.

NUTRIENT MEDIUM FOR PRODUCING CULTURES OF BACTEROIDS OF MICRO-ORGANISMS.

SPECIFICATION forming part of Letters Patent No. 674,764, dated May 21, 1901.

Application filed January 18, 1901. Serial No. 43,761. (No specimens.)

*To all whom it may concern:*

Be it known that I, RICHARD HARTLEB, a citizen of Germany, residing at Botanisches Institute der Hochsschule, Aachen, in the Empire of Germany, have invented certain new and useful Nutrient Media for Producing Cultures of Bacteroids of Micro-Organisms, (for which I have applied for a patent in Germany, dated July 18, 1899,) of which the following is a specification.

This invention relates to the cultivation of bacteroids of the microbes of leguminosæ or their permanent forms.

It is known that by inoculating arable soil with artificially-cultivated leguminosæ microbes the growth of plants of the leguminous family of plants is favorably influenced, the harvest is increased, and the soil is enriched in nitrogen. In this manner sterile soils may be raised to a high degree of fertility by growing leguminosæ crops without the necessity for nitrogenous manuring. It is not the bacteria hitherto used for inoculation that induce the infection and the growth of the plant by the formation of nodules and assimilation of nitrogen and enrich the soil in nitrogen, but the bacteroids (which constitute a stage of development between the bacteria and their spores) and the permanent forms of these bacteroids which are the true spores. If, therefore, the conditions for developing the bacteroids and their permanent forms do not supervene, the object of inoculating with the bacteria is not achieved and the development of the plants may even be injured. I have succeeded in producing at will a culture of these bacteroids and their permanent forms outside the plant by transferring the organisms of the leguminosæ to and further cultivating them in a nutrient medium which is characterized by the presence of an acid phosphate of one of the alkalies or alkali earths, a proteid or other organic compound of nitrogen, and a carbohydrate or other non-nitrogenous compound of carbon. The transference of the micro-organism to the above medium may be made at any stage of development. The culture succeeds rapidly both in liquid and in solid nutrients, provided they contain but a small proportion of an acid phosphate of one of the alkalies or alkali earths and a proteid—such as potassium, sodium, or calcium acid, legumin phosphate, and a source of carbon, such as grape-sugar, a form of starch, inulin, dextrin, arabinose, mannite, or some other carbohydrate. Instead of legumin there may be used as a source of nitrogen conglutin, gluten-casein, asparagine, leucine, or even ammonium salts or peptone. Less suitable for the purpose are nitrates. The legumin, conglutin, &c., are obtained in known manner from the shelled and ground seed or germs and are dissolved in an alkali or alkali-earth acid phosphate solution, or they may be dissolved in a neutral solution of phosphate of an alkali or alkali earth. In the latter case phosphoric acid is added, and this legumin-phosphate solution is added to the other ingredients of the nutrient medium. A productive development of the organism is also obtainable on solid phosphatic agar-agar culture media by addition of the above-named proteid as a source of carbon and nitrogen. In such a solid or liquid medium there is produced a normal development of bacteroids and their permanent forms in three to five days even if the culture be months' old.

The following receipt is one suitable for a solid nutrient medium for this invention: dissolve in one liter of water ten to fifteen grams of agar-agar, two-tenths to one gram of legumin-acid potassium phosphate, obtained as above described, and one to five grams of grape-sugar.

Gelatin cannot be substituted for agar-agar, as it is quite useless for the normal culture of the microbes of leguminosæ.

For the liquid nutrient medium the following receipt will generally suffice: dissolve in one liter of water one-tenth to one gram of legumin-acid potassium phosphate, one to five grams of grape-sugar, and traces of calcium chlorid and magnesium sulfate.

The percentage composition of these nutrient media here given is only by way of example. They must be varied as the kind and the vital force of the organism in question may require.

The essential condition for the growth of the culture is the use of an acid phosphate of one of the alkalies or alkali earths and a proteid or other equivalent compound.

Having thus described the nature of this invention and the best means I know of carrying the same into practical effect, I claim—

1. A nutrient medium for producing cultures of bacteroids of micro-organisms, containing an acid phosphate of one of the alkalies or alkali earths, a proteid, and a carbohydrate.

2. A nutrient medium for producing cultures of bacteroids of micro-organisms, containing legumin-acid potassium phosphate and grape-sugar.

In testimony whereof I have hereunto set my hand in presence of two suscribing witnesses.

RICHARD HARTLEB.

Witnesses:
FRITZ STOLLEWERK,
G. SCOTT.